July 7, 1925.
T. H. BROWN
1,544,801
COMBINED VAPORIZER AND MIXER
Filed June 2, 1924
2 Sheets-Sheet 2
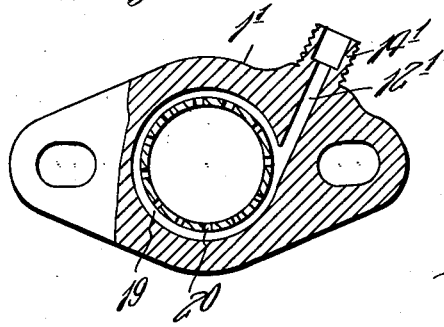
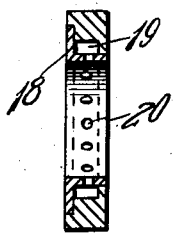
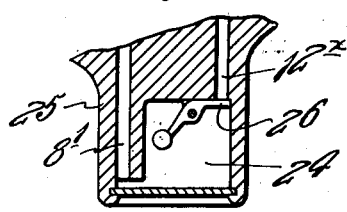
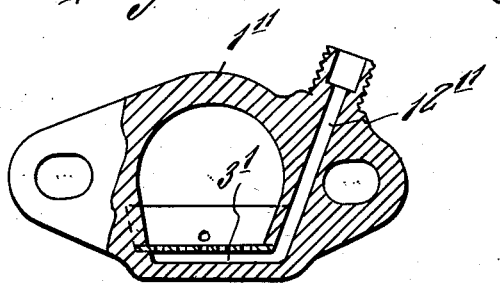
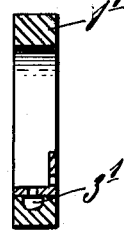
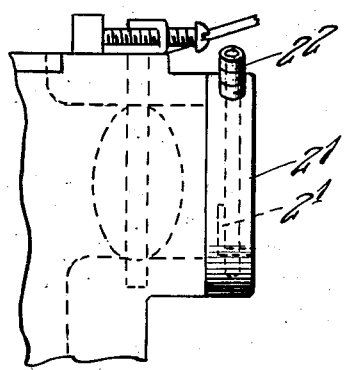
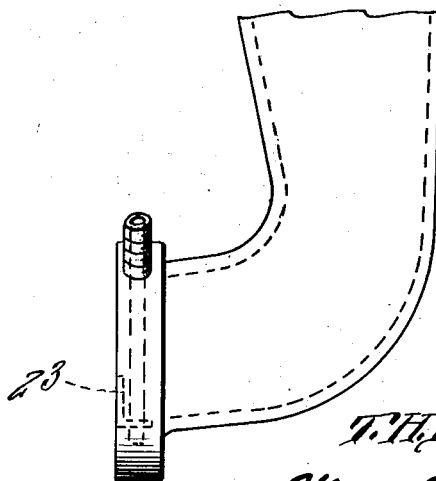
T. H. Brown
INVENTOR
BY Victor J. Evans
ATTORNEY
WITNESS:

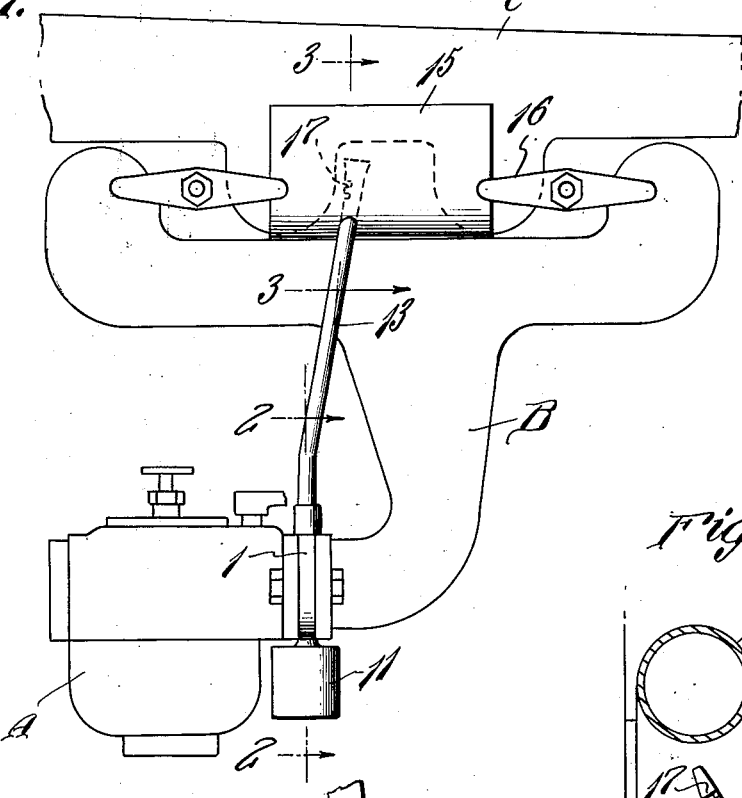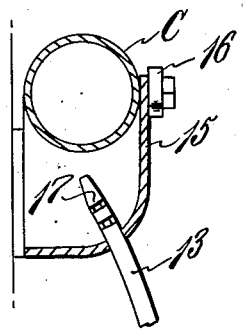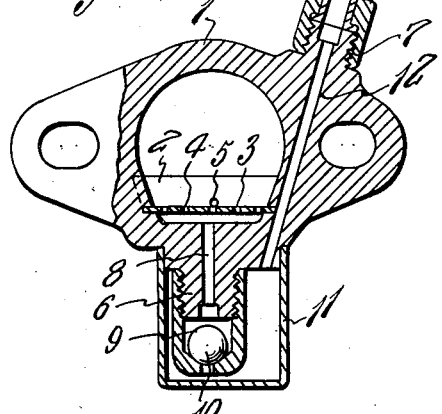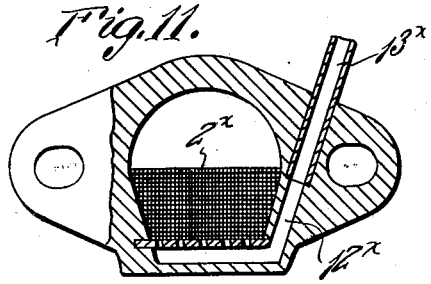

Patented July 7, 1925.

1,544,801

UNITED STATES PATENT OFFICE.

THOMAS H. BROWN, OF NATCHEZ, MISSISSIPPI.

COMBINED VAPORIZER AND MIXER.

Application filed June 2, 1924. Serial No. 717,418.

*To all whom it may concern:*

Be it known that I, THOMAS H. BROWN, a citizen of the United States, residing at Natchez, in the county of Adams and State of Mississippi, have invented new and useful Improvements in Combined Vaporizers and Mixers, of which the following is a specification.

This invention relates to a vaporizing device for internal combustion motors, the general object of the invention being to provide means for forming a chamber which is connected with the intake passage of the motor by perforations, with means for supplying heated air to the chamber so that this air entering the passage through the perforations will heat the mixture and more thoroughly vaporize it so that its combustibility qualities will be increased.

Another object of the invention is to arrange a baffle plate in the passage adjacent the perforations leading to the chamber which will act to bring the unvaporized fuel under the action of the air jets passing through the perforations so that this fuel will be vaporized.

A further object of the invention is to provide means for holding some of the fuel in the chamber or in a part associated with the chamber so that when the motor is again started this fuel will act as a priming charge to insure easy starting of the motor.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a fragmentary view showing the invention applied to an internal combustion motor.

Figure 2 is a section on line 2—2 of Figure 1.

Figure 3 is a section on line 3—3 of Figure 1.

Figure 4 is a sectional view through a modification.

Figure 5 is a transverse sectional view through Figure 4.

Figure 6 is a view similar to Figure 4 but showing a slightly different form.

Figure 7 is a transverse sectional view through Figure 6.

Figure 8 is a view showing the invention applied directly to a carbureter.

Figure 9 is a view showing the invention applied directly to the intake manifold.

Figure 10 is a sectional detail view of another modification.

Figure 11 is a view of another modification.

Referring to Figures 1, 2 and 3, 1 indicates a member which is shaped similar to the gasket which is placed between the carbureter A and the intake manifold B of an internal combustion motor and said member is adapted to be substituted for said gasket so that the explosive mixture passing from the carbureter into the manifold will pass through said member. An L-shaped baffle plate 2 is placed in the lower part of the member with its horizontal part forming a chamber 3 between itself and the bottom of the member. This member is located below the plane of the intake passage so that it is separated from said passage though it is in communication with the passage through the perforations 4 formed in said horizontal part. The vertical part of the plate is provided with a hole 5. A threaded boss 6 is formed on the lower part of the member 1 and a similar boss 7 is formed on the upper part thereof. A passage 8 extends through the boss 6 and has its upper end in communication with the chamber 3. A valve cage 9 is threaded to the boss and this cage carries a ball valve 10. A cup 11 is carried by the lower part of the member 1 and encloses the valve cage and a passage 12 connects the bore of the boss 7 with the chamber formed by said cup 11. A tube 13 has its lower end connected with the boss 7 by the coupling 14 and its upper end extends into a hot air chamber which is formed by the bent plate 15 which is clamped to the exhaust manifold C, preferably by the clamps 16 which hold the manifolds in place. The upper end of the tube 13 is closed but slots 17 are formed therein so that hot air can pass from the hot air chamber into the tube and will pass down the same through passage 12 into the chamber formed by the cup 11 and will pass by the valve 10, through the passage 8 into the chamber 3 and from this chamber the hot air will pass through the perforations 4 into the intake passage of the motor, thus mingling with the explosive charge therein and increasing the combustible qualities of the same. Some of the unvaporized fuel coming from the carbureter will strike the vertical part of the baffle plate 2 and will run down the same and pass through the hole 5 upon the vertical part of the plate where it will be subjected to the air jets created by the holes 4 so that this fuel will be vaporized and mingled with the rest of the charge flowing through the passage. The unvaporized fuel passing over the baffle plate will strike the walls of the intake manifold B and will flow back down the same upon the perforated part of the baffle part of plate 2 where it will be subjected to the air jets and thus vaporized. The air jets will also act upon the combustible charge passing through the member 1 and these jets will form a curtain of hot air which will act to vaporize most of the particles of unvaporized fuel in the mixture.

When the motor comes to rest the fuel collecting upon the walls of the intake manifold will run down the same upon the perforated plate 2, pass into the chamber 3 and from the chamber pass down the passage 8 into the cage 9 where it will be held by the valve 10 so that when the motor is again started this fuel will act as a priming charge and thus make easy starting of the motor.

This invention not only improves the combustible qualities of the explosive mixture and thus increases the efficiency of the motor but it also acts to prevent dilution of the crank case oil through the unvaporized parts of the fuel entering the crank case past the pistons as practically the entire charge is vaporized before it reaches the cylinders. It also acts to prevent carbon in the motor.

In the modification shown in Figure 4 I place an angle-shaped ring member 18 in the opening in the member 1' which forms an annular chamber 19 around said opening which is in communication with the opening through the perforations 20 formed in the member 18. This chamber 19 is connected by the passage 12' with the bore in the boss 14' which is adapted to receive a pipe which is connected with a stove on the exhaust manifold, as shown in Figure 1 so that hot air will pass from the stove through the passage 12' into the chamber 19 and will escape through the perforations 20 into the intake passage and thus mingle with the explosive charge to heat and vaporize the same. This is a much simpler form of the invention than that first described.

In the modification shown in Figures 6 and 7 a baffle plate is used as in the first form of the invention but the chamber 3' formed by said plate is connected directly with the passage 12'' in the member 1'' as the valve and cup are omitted. This form of the invention functions the same as that first described except that the chamber for collecting fuel to be used as an intial charge is omitted. However, a small quantity of fuel will be caught and held by the chamber 3'.

Figure 8 shows the invention applied directly to the carbureter. In this case the carbureter is provided with an enlargement 21 which is formed with a nipple 22 to receive the hot air pipe and the baffle plate 2' is arranged in the lower part of said enlargement. Figure 9 shows the invention applied directly to the manifold, the parts of the invention being carried by an enlargement 23 formed on the lower end of the manifold. Figure 10 shows a chamber 24 being formed in an extension 25 of the member with which the passage 8' and the passage 12 communicate. In this form the passage $12^x$ is controlled by a weighted valve 26 which tends to keep the passage closed in the initial starting of the motor so that the suction of the moving pistons when the motor first starts will draw up fuel from the chamber 24 which insures an easy starting of the motor.

Figure 11 shows the baffle $2^x$ as being perforated or formed of wire screen with the tube $13^x$ placed in an enlarged portion of the passage $12^x$ instead of being connected to a threaded boss on the member. This perforated baffle plate acts to break up the unvaporized particles of fuel so that it will more readily mix with the hot air from the jets. By using a perforated baffle a higher one can be used than by using an unperforated one. The tube $13^x$ can be pushed into the lower end of another tube which is connected with the stove or other heating device.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In an internal combustion motor a member adapted to be placed between the carbureter and intake manifold and having an opening therein for registering with the intake passage, an angle-shaped plate carried by the member, the horizontal part of which is perforated and forms a chamber in the lower part of the member and the vertical part of which forms a baffle plate, said vertical part having a hole therein, a cup-shaped member connected with the lower end of the member and forming a chamber, which is in communication with the first mentioned chamber, a valve in the second chamber, a cup enclosing the first cup and forming a chamber, a passage in the member connected with the chamber formed by said cup, and a pipe for supplying air to the last mentioned passage.

In testimony whereof I affix my signature.

THOMAS H. BROWN.